Patented Mar. 10, 1936

2,033,782

UNITED STATES PATENT OFFICE 2,033,782

CELLULOSE TREATMENT

William D. Nicoll, Wilmington, Del., assignor to E. I. du Pont de Nemours & Company, Wilmington, Del., a corporation of Delaware No Drawing. Application June 27, 1934, Serial No. 732,661

16 Claims. (Cl. 260—146)

This invention relates to a process for treating cellulose and particularly to a process for the preparation of cellulose of low solution viscosity suitable for the preparation of cellulose derivatives of low solution viscosity.

The preparation of cellulose and cellulose derivatives of low solution viscosity is a matter of considerable importance, in view of the widespread use of cellulose derivative lacquers and of the widespread manufacture of artificial materials of regenerated cellulose. Various processes have been desired for the preparation of cellulose of low solution viscosity but all of these processes suffer from certain disadvantages.

This invention has as an object the preparation of cellulose characterized by low solution viscosity without, at the same time, seriously degrading or injuring the cellulose. A further object is the production of a cellulose of low solution viscosity which may be converted to various useful derivatives of cellulose also exhibiting low solution viscosity and capable of being shaped in useful forms such as films, threads, plastics, and the like. A still further object is the provision of a rapid, simple, and readily controlled method for reducing cellulose viscosity. A still further object is the preparation of cellulose derivatives of low solution viscosity from cellulose of solution viscosity lowered by the processes of the present invention. Other objects will appear hereinafter.

These objects are accomplished by the following invention wherein cellulose is treated with a solution containing up to 0.05% of a mineral acid and then dried by contact with a hygroscopic environment, preferably a current of a substantially inert hygroscopic gas, at an elevated temperature. The cellulose of solution viscosity lowered by this process may then be treated for the preparation of cellulose derivatives of lowered solution viscosity.

The cellulose which is to be reduced in viscosity by the methods of the present invention may be obtained from any convenient source and may be used in any convenient form, depending in part on the ultimate use to be made of the low viscosity product. In the preparation of many cellulose esters, for example, cellulose nitrate or cellulose acetate, it is customary to use the cellulose in the form of loose cotton linters, while cellulose to be used in the preparation of viscose is more conveniently obtained in the form of sheets or rolls of either cotton or wood pulp cellulose.

The first step in this process consists in steeping the cellulose for a short time, generally under ten minutes, in a solution containing 0.05% or less of a mineral acid. The time of steeping is in general not critical inasmuch as according to the theory of the process, the solution viscosity is not greatly affected by a more prolonged steep. The preferred acids are hydrochloric, nitric, or sulfuric acid, but other acids, such as phosphoric, sulfurous, persulfuric, etc., may also be utilized. Below the concentration limit of 0.05% the optimum concentration of acid to be used may vary and will depend upon the original viscosity of the cellulose, the degree of viscosity reduction desired, the temperature used for drying, and, in particular, the amount of and rate at which the air is made to circulate around the cellulose fibers during the drying operation. After steeping, the excess acid is pressed, centrifuged or drained off and the acid-wet cotton is rapidly dried by a stream of warmed air. It is in this step that the critical factors of the invention come into play. Whether or not the heated air used for drying the cellulose is in rapid motion, is re-circulated, or is used only once, has an important bearing on the degree of viscosity reduction obtained and on the chemical properties, such as solubility in caustic soda solution, reducing power, etc., of the reduced viscosity cellulose. To produce the best results, the air should be circulated fairly rapidly, as it has been observed that a slow circulation of air, particularly at temperatures above 80° C., results in an uneven action of the acid and may even produce charring of the cellulose. The acid-wet cellulose may be dried, however, at temperatures as high as 100° C. without danger of charring if the air is rapidly passed through the cellulose, by means of an air-blast. Temperatures between 40° and 80° C. have been found satisfactory for use with a moderate circulation of air.

Once the cellulose attains a substantially dry condition, additional heating or drying has very little effect on its viscosity and does not otherwise injure the cellulose. It is important, however, that the acid-treated cellulose be not held in storage for too long a time after drying and before using, for, if it is allowed to regain moisture, the acid in the cellulose will again begin to act and will further reduce the viscosity of the cellulose. It is thus desirable in most cases to use the acid-treated cellulose within a few hours after its drying.

The types of apparatus selected for steeping and drying of the cellulose will depend largely on the physical form of the cellulose treated, and on the use to which the low viscosity product is to be put. Cellulose in loose form, such as cotton linters, may be conveniently steeped in large tanks or tubs containing the dilute acid, and the cotton subsequently passed through a cotton dryer of the type commonly used in the nitrocellulose industry. In the case of cellulose in sheet or roll form it is often necessary to maintain this form. The sheets or rolls may therefore be passed through a dilute acid bath, between squeeze rolls, and then dried by passing over heated rolls of the type used in a paper-machine, or through a drying chamber in which a good circulation of air is maintained.

Having outlined above the general principles of the invention, the following examples are added, not in limitation, but in order to illustrate some of the various ways in which the viscosity reduction may be effected:

Example 1

One part of purified cotton linter cellulose was steeped for ten minutes at room temperature in 30 parts of a 0.02% solution of hydrochloric acid, the cotton was then centrifuged to 1.5 times its original weight and placed in a drying chamber through which air heated to 100° C. was forced under 60 pounds pressure. After fifteen minutes, this cellulose was substantially dry, and it was found that the viscosity had been reduced from 8.5 centipoises to 4.1 centipoises. The viscosity of these samples was determined in a cuprammonium solution containing 1% cellulose, 1% copper and 28% ammonia. The measurements were made by means of calibrated capillary pipettes.

Example 2

Cotton linters of the same initial viscosity as that used in Example 1 was steeped in 30 parts of a 0.05% nitric acid solution and, after centrifuging, was dried for 20 minutes at 100° C. in a blast of heated air. The viscosity of the final product in this case was 3.85 centipoises. The amount of soda-soluble material present in this cotton was 4.49% as against 2.15% in the original cotton.

Example 3

Extremely high viscosity linters of a type used in the manufacture of dynamite nitrocellulose was steeped for a few minutes in 0.05% nitric acid, and dried at 100° C. in a rapid blast of air for 20 minutes. The initial viscosity of this cotton was too high to measure in a 1% copper ammonia solution, but the acid-treated cotton possessed a viscosity of only 4.6 centipoises.

Example 4

Six hundred grams of air-dried cotton linters in board form of a type used in the viscose industry were steeped in 3 liters of 0.03% hydrochloric acid solution for about 1 minute, drained of excess acid, and dried for 45 minutes in an oven through which was blown a blast of air warmed to 65° C. The viscosity of this cellulose was reduced from 8.5 centipoises to 3.9 centipoises, as measured by the method outlined in Example 1. To further illustrate the change produced in this sample of cellulose, some of the reduced viscosity product was steeped in mercerizing caustic and converted to alkali cellulose by pressing and shredding in the usual manner. This alkali cellulose was in turn treated with carbon bisulfide to form cellulose xanthate, which was dissolved in dilute caustic soda solution to form a viscose containing 6% total alkali and 7% cellulose. The viscosity of this viscose solution was found to be 150 seconds as compared with about 1700 seconds for viscose of similar composition prepared from unaged alkali cellulose made from the original untreated cellulose.

The following examples illustrate the preparation of other cellulose derivatives from the reduced viscosity cellulose of the present invention:

Example 5

Cellulose pretreated as under Example 2 was nitrated with a mixed acid containing approximately 23% nitric acid, 59.3% sulfuric acid, and 17.7% water for a period of 30 minutes at a temperature of 48° C. The resulting nitrocellulose, after stabilization, showed a nitrogen content of 12.06% and a viscosity of 8 seconds measured by the Hercules falling ball method which is a standard method in the nitrocellulose industry. By way of comparison, a similar nitration of the original cellulose (without pretreatment and viscosity of 8.5 c. p.) produced a nitrocellulose of approximately the same nitrogen content but characterized by a viscosity of approximately 60 seconds on the same scale as used above.

Example 6

Cellulose pretreated as under Example 4 was converted to ethyl cellulose by reaction with ethyl chloride in the presence of caustic soda, and the resulting cellulose ether was dissolved in a mixture of 80 parts toluene and 20 parts alcohol to form a 10 percent solution. The viscosity of this solution was found to be 3.5 seconds as compared with 8.5 seconds obtained for a solution of similar composition containing ethyl cellulose prepared in exactly the same manner as above except that the cellulose was not pretreated in any way.

The low viscosity celluloses produced by the process of the present invention are not to be confused with the hydrocellulose which is produced by other types of acid treatment. One characteristic of hydrocelluloses is a high degree of solubility in boiling 7.14% caustic soda solution, but the celluloses produced by the process of the present invention are only slightly more soluble in this concentration of caustic soda than the original material. A cellulose, for example, of 8.5 centipoise viscosity, containing 2–3% of caustic-soluble material, will, when reduced in viscosity to 4 centipoises by either the acid-gas or aqueous acid method, possess a soda-solubility of well over 10%. When the same cellulose is reduced in viscosity to the same extent by the dilute acid-rapid drying process of the present invention, it is found to have a soda-solubility of only 4–5% and can not be regarded therefore as a hydrocellulose. The cellulose reduced in viscosity by the process of the present invention retains its original fibrous structure, and can be readily handled in any of the ordinary processes of esterification or etherification.

While in the examples a blast of air has been used, it is obvious that any hygroscopic inert gas may be used such as nitrogen, carbon monoxide, hydrogen, carbon dioxide, etc. While exposure to a hygroscopic inert gas is much more convenient than exposure of the cellulose to heat and vacuo, this last modification of a relatively dry or hygroscopic atmosphere or environment of low humidity or high capacity for taking up moisture is included within the scope of the present invention. The vacuum while of course never perfect may be practically complete, e. g., 0.01 mm. or may be only partial, e. g., 100, 300, etc. mm.

Instead of steeping the cellulose in a dilute acid solution as outlined in Examples 1 to 4, it is sometimes convenient and is permissible to spray the acid onto the cellulose in either a batch or continuous manner. The removal of excess acid prior to drying cellulose may be either fairly complete or not as the case requires and the equipment permits. If the drying operation is sufficiently rapid, it has been found that the total amount of acid remaining in the cellulose does not greatly affect the extent of viscosity reduction obtained. Under the conditions of rapid drying such as 15 to 20 minutes at 100° C. the time is so short during which the cellulose is exposed to a concentrated acid that the quantity of acid is not highly important but this factor takes on increasing importance under conditions where the cellulose is dried more slowly, e. g., at 70°–80° C. Where lower temperatures of drying are used maximum uniformity of results are obtained when a uniform amount of acid is left in the cellulose. The quantity of aqueous acid is preferably fairly low, e. g., 1.5 to 3 times the weight of the dry cellulose. This can be adjusted by several means in addition to those given in the examples, the more common being pressing, centrifuging, squeezing, draining, or by the use of a suction roll. In the drying operation it is permissible to use a wide variety of conditions and types of equipment, as for example drying-tunnels, heated rolls, or any container thru which hot air may be blown. The important feature is that the drying should be done rapidly. At a given high temperature a rapid flow of air causes a smaller reduction in viscosity than a slow flow of air.

The process of the present invention has the advantage over other methods involving the action of acids on cellulose in that it is rapid, simple to operate, and can be controlled more accurately. Expensive or complicated equipment is not necessary for carrying out the invention, and in most cases the acid-drying process of the present invention can be readily fitted into existing processes where cellulose is prepared for conversion to cellulose derivatives. There is less danger of corrosion to equipment, especially where a non-volatile acid such as sulfuric is used in the process. The process is more rapid and simple of operation than an alkaline digestion, and is more economical of material than is the latter.

The time of drying cellulose is governed mainly by the temperature employed. "Rapid" drying as used in this specification applies to less than 30 minutes at 100° C., but may be 45 to 60 minutes at 60°–80° C.

The above description and examples are intended to be illustrative only. Any modification of or variation therefrom which conforms to the spirit of the invention is intended to be concluded within the scope of the claims.

I claim:

1. A method of reducing the solution viscosity of cellulose which comprises treating cellulose with a solution containing a mineral acid in an amount up to 0.05%, separating excess acid, and drying said cellulose containing dilute acid in contact with a hygroscopic environment at an elevated temperature up to about 100° C.

2. Process which comprises reducing the solution viscosity of cellulose by drying, in contact with a current of substantially inert hygroscopic gas at an elevated temperature up to about 100° C., acid moist cellulose which has been impregnated with a solution of a volatile mineral acid in an amount up to 0.05% and then centrifuged.

3. A method of reducing the solution viscosity of cellulose which comprises treating cellulose with a solution containing a mineral acid in an amount up to 0.05%, separating excess acid, and drying said cellulose containing dilute acid in contact with a current of a substantially inert hygroscopic gas at an elevated temperature up to about 100° C.

4. A method of reducing the solution viscosity of cellulose which comprises treating cellulose with a solution containing a mineral acid in an amount up to 0.05%, separating excess acid, and drying said cellulose containing dilute acid in contact with warm dry air.

5. A method of reducing the solution viscosity of cellulose which comprises treating a cellulose with up to 0.05% hydrochloric acid solution, separating excess acid, and drying said cellulose containing dilute acid in contact with a current of a substantially inert hygroscopic gas at an elevated temperature up to about 100° C.

6. Process which comprises reducing the solution viscosity of cellulose by drying, in contact with a current of substantially inert hygroscopic gas at an elevated temperature up to about 100° C., acid moist cellulose impregnated with up to 0.05% hydrochloric acid solution and then centrifuged.

7. A method of reducing the solution viscosity of cellulose which comprises treating cellulose with up to 0.05% hydrochloric acid solution, separating excess acid, and drying said cellulose containing dilute acid in contact with a current of warm dry air.

8. A method of reducing the solution viscosity of cellulose which comprises steeping cellulose in approximately 30 parts of 0.02% solution of hydrochloric acid, centrifuging to 1.5 times the original weight of the cellulose, and drying said cellulose containing dilute acid in a current of air heated at 100° C.

9. Process of preparing low viscosity cellulose derivatives which comprises treating cellulose with a solution containing up to 0.05% of a mineral acid, separating excess acid, drying said cellulose containing dilute acid in contact with a current of a substantially inert hygroscopic gas at an elevated temperature up to about 100° C., and thereafter replacing at least a portion of the hydroxyl hydrogen of the cellulose by a radical of the class consisting of ether and ester radicals.

10. A method of preparing low viscosity cellulose nitrate which comprises treating cellulose with 30 parts by weight of 0.05% nitric acid solution, centrifuging, drying said cellulose containing dilute acid for 20 minutes at 100° C. in a blast of heated air, nitrating with a mixed acid containing approximately 23% nitric acid, 59.3% sulfuric acid, and 17.7% water for a period of 30 minutes at a temperature of 48° C. and stabilizing.

11. A method of preparing low viscosity cellulose nitrate, which comprises treating cellulose with an excess of dilute nitric acid containing up to 0.05% nitric acid, removing excess acid, drying said cellulose containing dilute acid in a blast of air heated at an elevated temperature up to about 100° C., nitrating said dried cellulose and stabilizing.

12. A method for preparing low viscosity cellulose esters, which comprises treating cellulose with an excess of dilute nitric acid containing up to 0.05% nitric acid, removing excess acid, drying said cellulose containing dilute acid in a blast of air heated to an elevated temperature up to about 100° C., and esterifying said dried cellulose.

13. Process of converting high viscosity cellulose to low viscosity cellulose without substantially increasing the alkali-soluble content thereof, which comprises preparing a dilute-acid-wet cellulose by steeping a high viscosity cellulose in an excess volume of dilute acid containing up to 0.05% mineral acid, pressing off the excess liquid and rapidly drying the acid-wet cellulose thus obtained by contacting with a stream of warmed air.

14. Process of preparing a low viscosity cellulose ester, which comprises preparing low viscosity cellulose by the process of claim 13 and subjecting the dried product to esterification.

15. Process of preparing a low viscosity cellulose ether, which comprises preparing low viscosity cellulose by the process of claim 13 and subjecting the dried product to esterification.

16. Process of preparing a low viscosity cellulose nitrate, which comprises preparing low viscosity cellulose by the process of claim 13 and subjecting the dried product to nitration.

WILLIAM D. NICOLL.